United States Patent
Steinle et al.

(10) Patent No.: US 6,600,986 B2
(45) Date of Patent: Jul. 29, 2003

(54) METHOD FOR THE LONGITUDINAL CONTROL OF A VEHICLE IN WHICH INFORMATION OF A NAVIGATION SYSTEM IS DETECTED

(75) Inventors: Joachim Steinle, Munich (DE); Michael Schraut, Munich (DE); Uwe Proemm, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 09/905,910

(22) Filed: Jul. 17, 2001

(65) Prior Publication Data

US 2002/0038175 A1 Mar. 28, 2002

(30) Foreign Application Priority Data

Sep. 27, 2000 (DE) .......................... 100 47 746

(51) Int. Cl.[7] .............. G06F 7/00; G05D 1/00
(52) U.S. Cl. .............. 701/70; 701/93; 701/96; 701/301; 340/903; 340/435; 340/436; 340/437; 180/167; 342/70
(58) Field of Search .............. 701/70, 93, 96, 701/300, 301, 97, 207, 208; 180/179, 167, 168, 169; 340/438, 901, 902, 903, 904, 436, 437, 435; 342/69, 70, 46, 47, 71

(56) References Cited

U.S. PATENT DOCUMENTS

| | | | | |
|---|---|---|---|---|
| 5,323,321 A | | 6/1994 | Smith, Jr. et al. .......... 701/207 |
| 5,400,864 A | * | 3/1995 | Winner et al. .............. 180/169 |
| 5,510,990 A | * | 4/1996 | Hibino et al. ............... 180/169 |
| 5,521,579 A | * | 5/1996 | Bernhard .................... 180/167 |
| 5,529,139 A | * | 6/1996 | Kurahashi et al. .......... 180/169 |
| 5,710,565 A | * | 1/1998 | Shirai et al. ................ 340/903 |
| 5,754,099 A | * | 5/1998 | Nishimura et al. ......... 340/435 |
| 5,818,355 A | * | 10/1998 | Shirai et al. ................ 180/167 |
| 5,977,869 A | * | 11/1999 | Andreas .................... 180/167 |
| 6,032,097 A | * | 2/2000 | Iihoshi et al. .............. 180/168 |
| 6,049,749 A | | 4/2000 | Kobayashi .................. 701/49 |
| 6,233,516 B1 | * | 5/2001 | Egawa ........................ 180/167 |
| 6,311,120 B1 | * | 10/2001 | Asada ......................... 340/903 |
| 6,418,370 B1 | * | 7/2002 | Isogai et al. ................ 180/170 |

FOREIGN PATENT DOCUMENTS

| | | |
|---|---|---|
| DE | 42 08 012 A1 | 3/1992 |
| DE | 196 01 831 A1 | 1/1996 |
| DE | 196 14 061 A1 | 4/1996 |
| DE | 196 38 511 A1 | 9/1996 |
| EP | 0901929 | 9/1998 |

OTHER PUBLICATIONS

German Search Report and translation of relevant portions thereof.

* cited by examiner

Primary Examiner—Jacques H. Louis-Jacques
(74) Attorney, Agent, or Firm—Crowell & Moring LLP

(57) ABSTRACT

A method for the longitudinal control of a vehicle, in which information of a navigation system is detected and in which, as a function of the information of the navigation system, a desired value of at least one parameter for the longitudinal control is defined, during a longitudinal control operation, on the basis of a defined desired distance from a preceding vehicle by means of information of the navigation system. The probability is determined with which the preceding vehicle and/or the own vehicle is cornering when the preceding vehicle is no longer detected. A longitudinal acceleration takes place in a time-delayed manner when the probability is greater than a defined threshold.

6 Claims, 2 Drawing Sheets

METHOD FOR THE LONGITUDINAL CONTROL OF A VEHICLE IN WHICH INFORMATION OF A NAVIGATION SYSTEM IS DETECTED

BACKGROUND AND SUMMARY OF THE INVENTION

This application claims the priority of German patent document 100 47 746.1, filed Sep. 17, 2000, the disclosure of which is expressly incorporated by reference herein.

The invention relates to a method for longitudinal control of a vehicle having a vehicle navigation system.

Such a control system is disclosed for example, in German Patent Document DE 196 38 511 A1. In particular, cruise control systems of this type control the driving and/or braking systems of a vehicle such that either a desired speed or a desired distance from the preceding vehicle is set. In a method disclosed in German Patent Document DE 196 38 511 A1, such cruise control systems are supplied with information of a navigation system that is also present in the vehicle. For this purpose, for example, a control unit assigned to a longitudinal control system may have an interface to the electronic system of the navigation system.

Known longitudinal control systems have been designed to accelerate automatically to a desired speed when a follow-on drive (with a defined desired distance) is terminated, for example when the vehicle changes to a free lane or a preceding vehicle changes lane. However, even when using information of a navigation system, no reliable detection of the lane change has thus far been possible because, due to tolerances in the road nets stored in the navigation, and in the sensors used to determine the position of the vehicle (GPS).

The presence or absence of a preceding vehicle (target object) in the vehicle's own lane also cannot be with a sufficiently high reliability by means of ranging sensors (radar, ultrasound, infrared as well as image processing) because the detection range (detection angle) of the sensors is relatively small.

One object of the invention is to assess certain lane changing situations using information of the navigation system.

Another object of the invention is to distinguish a lane changing situation from a cornering, in which a loss of the target object occurs without a lane change.

These and other objects and advantages are achieved by the method and apparatus according to the invention in which, during a longitudinal control operation based on a defined desired distance from a preceding vehicle, information from the navigation system is used to determine the probability that the preceding vehicle and/or the own vehicle is cornering when the preceding vehicle is no longer detected. A longitudinal acceleration is carried out with a time-delay when the probability is higher than a defined (variable or fixed) threshold.

To determine the probability that the preceding vehicle and/or the own vehicle is cornering, the road type (turnpike, country road; number and/or width of the lanes of a road; degree of curvature of the course of the road; turn-off possibilities) is analyzed. Information concerning the road type is available by way of the navigation system.

To determine the probability that the own vehicle is cornering, additional values relating to driving dynamics (steering angle, yaw rate, lateral acceleration) may be analyzed. Such information is determined by means sensors inside the vehicle.

The process according to the invention is preferably integrated in a control unit which is otherwise already provided for a longitudinal control system. For this purpose, only an interface to the navigation system must be established.

The extraction and processing of information from the navigation system to determine the actual and future context according to the invention permits an adaptive control of the longitudinal dynamics based on the respective situation, and is typical with respect to the driver by means of a longitudinal control system. The operating quality and the driving comfort are increased.

Other objects, advantages and novel features of the present invention will become apparent from the following detailed description of the invention when considered in conjunction with the accompanying drawings.

DETAILED DESCRIPTION OF THE DRAWINGS

Figure 1:
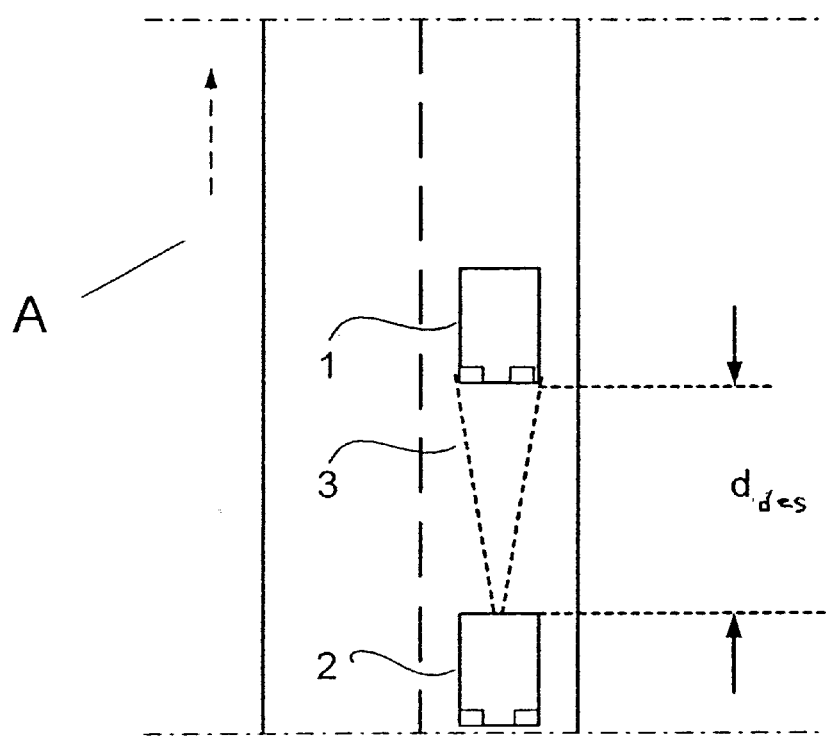
FIG. 1 is a view of a first route section without a curve.

On route section A in FIG. 1 (with the driving direction indicated by a broken arrow), the vehicle 2 follows a preceding vehicle 1 (follow-on drive) at a defined desired distance $d_{des}$. The detection range for detecting a preceding vehicle is entered in the form of the detection angle 3.

Figure 2:
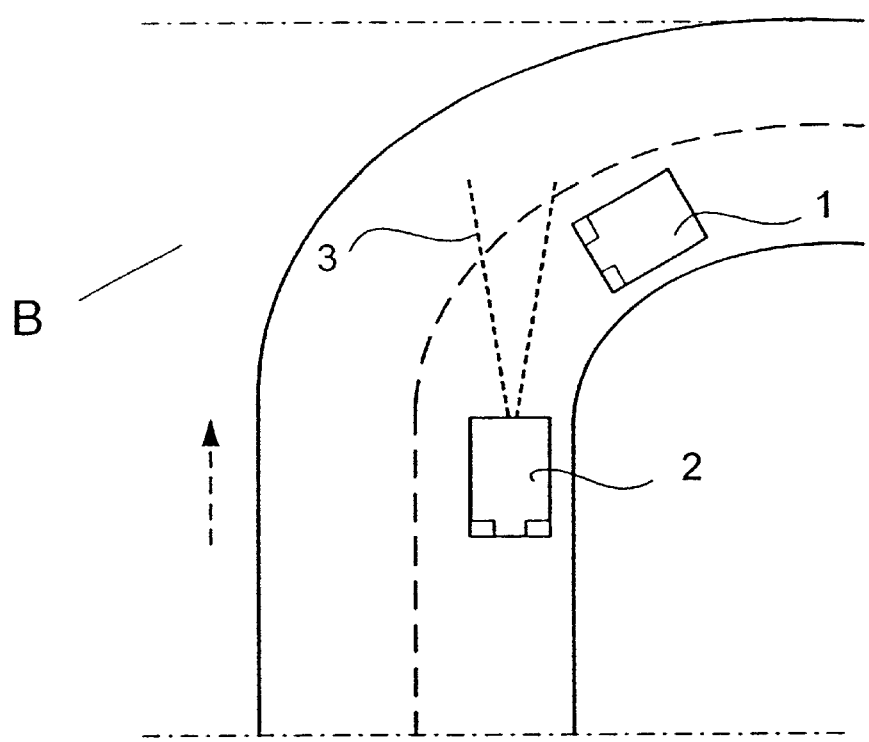
FIG. 2 is a view of a second curve section with a curve.

In route section B in FIG. 2, the preceding vehicle 1 leaves the detection range (detection angle 3) because of a pronounced curve although vehicle 1 is still situated in the same lane as vehicle 2. Without the probability determination according to the invention, the longitudinal control system would conclude that either the preceding vehicle 1 or the own vehicle has changed lanes and would terminate the ranged follow-on drive; possibly accelerating to a defined desired speed.

The longitudinal control system according to the invention contained in vehicle 2 has to determine the probability w that at least the preceding vehicle 1 is cornering, because a lane change cannot be unambiguously detected. This situation may occur "in front of the curve" as well as "in the curve". "In front of the curve" means that the preceding vehicle is cornering. "In the curve" means that at least the own vehicle 2 is cornering.

Figure 3:
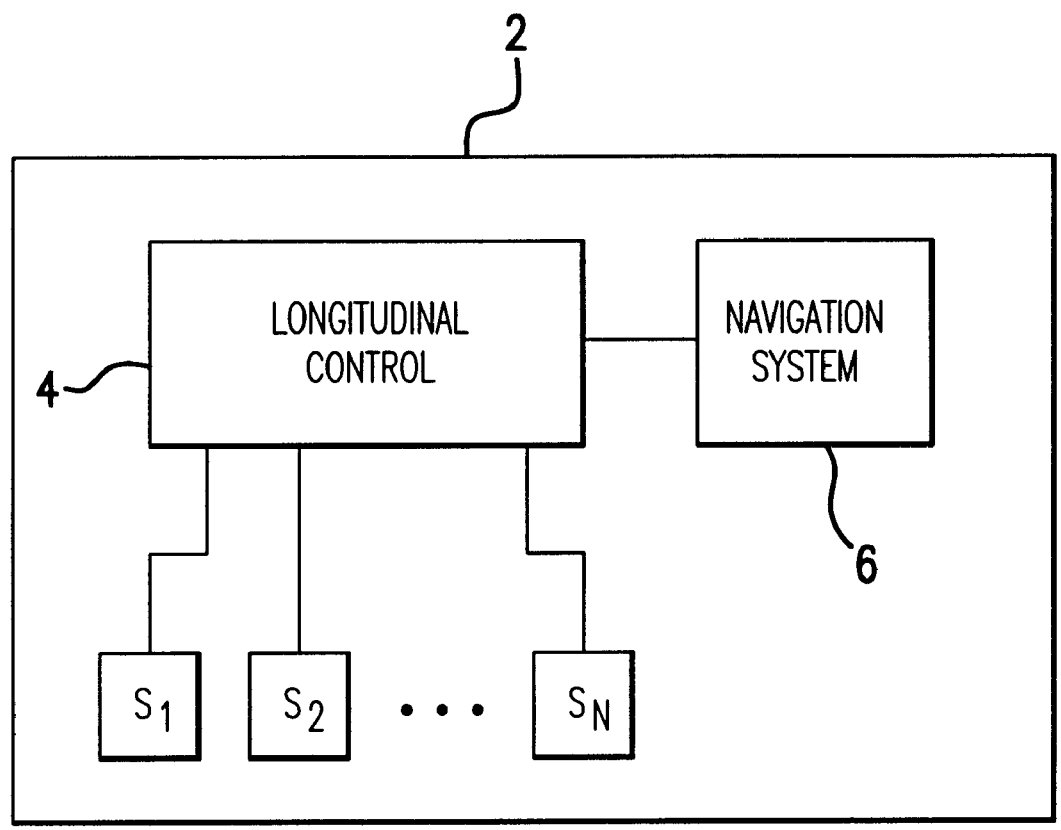
FIG. 3 is a block diagram of a vehicle control system according to the invention.

For this purpose, as shown in FIG. 3, a control unit of the longitudinal control system 4 in vehicle 2, on the one hand, analyzes information of the navigation system 6 as well as additional operating values of vehicle 2, obtained from sensors and vehicle systems $S_1$–$S_n$. The information may, for example, be the actual position of vehicle 2 and the road type. The road type comprises, for example, the road category (turnpike, country road, etc.), the curvature of the course of the road, the width and the number of lanes of the driven road and the turn-off possibilities. The operating values may particularly be the dynamic values (such as the steering angle, the yaw rate, the lateral acceleration; the turn signals, the vehicle speed signal, the accelerator generator signal or the operating signals of the operating lever assigned to the longitudinal control system.)

When the target object (here vehicle 1) is no longer in the detection range 3, the probability that the target object has not yet left the driving lane or that only a curve exists in the case of one-lane roads, increases in the case of wide lanes, on winding country roads, the lower the admissible maximum speed when there was no turn-off possibility and the more winding the course of the road. In contrast, operation of the vehicle's own turn signal and/or a course of the driving-dynamics-related values characteristic of a lane change can point more to a lange change of the own vehicle than to cornering.

Proportionally to the course of the probability, the longitudinal acceleration can be carried out with an increasing or decreasing time delay. If the probability of a cornering is near 100 percent, the longitudinal acceleration can be completely prevented even when the preceding vehicle 1 is no longer detected.

Delay of the longitudinal acceleration is prevented, on the other hand, when the driver evidences a desire for more driving power (for example, by way of the accelerator pedal or by way of the operating element assigned to the longitudinal control system for increasing the setting speed).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for longitudinal control of a vehicle having a vehicle navigation system that generates information based on which a desired value of at least one parameter for longitudinal vehicle control is defined, said method comprising:

during a longitudinal control of the vehicle based on a defined desired distance from a preceding vehicle, when the preceding vehicle is no longer detected, using information from the navigation system to determine a probability that either the vehicle or the preceding vehicle is cornering; and delaying a longitudinal acceleration of the vehicle when the determined probability is greater than a fixed or variable defined threshold.

2. The method according to claim 1, wherein said step of determining the probability that the vehicle or the preceding vehicle is cornering, includes analysis of a road type on which the vehicle is operated.

3. The method according to claim 1, wherein the step of determining the probability that the vehicle is cornering includes analysis of driving-dynamics-related values.

4. In a longitudinal control system for a vehicle having a vehicle navigation system, the apparatus comprising:

a control unit which receives navigational information from said navigation system, and additional vehicle operational information from sensors and systems on board said vehicle; wherein, said control unit uses at least said navigational information to determine a probability that either the vehicle or a preceding vehicle is cornering, when said preceding vehicle is no longer detected during a longitudinal control of the vehicle based on a defined distance to the preceding vehicle; and said control unit causes a delay of longitudinal acceleration of the vehicle when the determined probability is greater than a defined threshold value.

5. A longitudinal control system for a vehicle according to claim 4, wherein said step of determining a probability is based on vehicle operational information from said sensors and systems in addition to navigational information.

6. A method for operating a vehicle longitudinal speed control system which controls operating speed of a controlled vehicle alternatively based on a predetermined desired operating speed or a predetermined desired distance to a target vehicle detected within a detection range ahead of said controlled vehicle, wherein when the system is operating according to said predetermined desired distance and a detected target vehicle departs the detection range, said system automatically enables an acceleration of said host vehicle to said predetermined desired speed; said method comprising:

during operation of said system according to said desired distance, upon departure of a previously detected target vehicle from said detection range, determining a probability that one of said controlled vehicle and said target vehicle is cornering; and when said probability exceeds a predetermined value, delaying any acceleration of said host vehicle to said desired speed, for a predetermined time period.

* * * * *